United States Patent
Moore et al.

(10) Patent No.: US 11,745,268 B2
(45) Date of Patent: Sep. 5, 2023

(54) MELTED METAL LEVEL SENSOR FOR A METAL DROP EJECTING THREE-DIMENSIONAL (3D) OBJECT PRINTER

(71) Applicant: Xerox Corporation, Norwalk, CT (US)

(72) Inventors: Steven R. Moore, Pittsford, NY (US); Dinesh Krishna Kumar Jayabal, Cary, NC (US)

(73) Assignee: Xerox Corporation, Norwalk, CT (US)

( * ) Notice: Subject to any disclaimer, the term of this patent is extended or adjusted under 35 U.S.C. 154(b) by 120 days.

(21) Appl. No.: 17/319,830

(22) Filed: May 13, 2021

(65) Prior Publication Data
US 2022/0362858 A1 Nov. 17, 2022

(51) Int. Cl.
| | |
|---|---|
| *B22F 12/90* | (2021.01) |
| *B22F 12/53* | (2021.01) |
| *B22F 10/85* | (2021.01) |
| *B33Y 70/00* | (2020.01) |
| *B33Y 10/00* | (2015.01) |
| *B33Y 30/00* | (2015.01) |
| *B33Y 50/02* | (2015.01) |
| *B22F 12/57* | (2021.01) |
| *B22F 10/22* | (2021.01) |

(52) U.S. Cl.
CPC .............. *B22F 12/90* (2021.01); *B22F 10/22* (2021.01); *B22F 10/85* (2021.01); *B22F 12/53* (2021.01); *B22F 12/57* (2021.01); *B33Y 10/00* (2014.12); *B33Y 30/00* (2014.12); *B33Y 50/02* (2014.12); *B33Y 70/00* (2014.12)

(58) Field of Classification Search
CPC .......... B22F 12/90; B22F 12/53; B22F 10/85; B22F 10/22; B22F 10/30; B33Y 10/00; B33Y 30/00; B33Y 50/02; B33Y 70/00
USPC ....................................... 219/73.21
See application file for complete search history.

(56) References Cited

U.S. PATENT DOCUMENTS

| | | | | |
|---|---|---|---|---|
| 5,746,844 | A | * | 5/1998 | Sterett ............. B22F 12/33 427/469 |
| 9,616,494 | B2 | | 4/2017 | Vader et al. |
| 10,040,119 | B2 | | 8/2018 | Vader et al. |
| 2015/0069107 | A1 | * | 3/2015 | Lu ................ B23K 3/063 226/8 |
| 2017/0087632 | A1 | * | 3/2017 | Mark ............. B22D 11/01 |
| 2017/0266728 | A1 | * | 9/2017 | Johnson .......... B22F 12/55 |
| 2019/0375003 | A1 | | 12/2019 | Mark |
| 2020/0262133 | A1 | | 8/2020 | Vader et al. |
| 2020/0324486 | A1 | | 10/2020 | Mantell et al. |
| 2021/0001402 | A1 | * | 1/2021 | Matthews ........ B23K 26/1476 |

* cited by examiner

*Primary Examiner* — John J Norton
*Assistant Examiner* — Simpson A Chen
(74) *Attorney, Agent, or Firm* — Maginot Moore & Beck LLP

(57) ABSTRACT

A three-dimensional (3D) metal object manufacturing apparatus is equipped with a wire detector to determine a position of a top surface of melted metal contained in a receptacle of a heated vessel in the apparatus from time to time. The solid metal wire being fed into the heated vessel is retracted and the length of the retracted wire is determined using a signal generated by the wire detector. The determined length of the wire is used to identify the position of the top level of the melted metal in the receptacle so the receptacle can be replenished if the level has fallen below a predetermined capacity for the receptacle.

15 Claims, 5 Drawing Sheets

MELTED METAL LEVEL SENSOR FOR A METAL DROP EJECTING THREE-DIMENSIONAL (3D) OBJECT PRINTER

TECHNICAL FIELD

This disclosure is directed to three-dimensional (3D) object printers that eject melted metal drops to form objects and, more particularly, to the measurement of the amount of melted metal available in such printers for ejection.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use ejectors that eject UV-curable materials, such as photopolymers or elastomers. The printer typically operates one or more extruders to form successive layers of the plastic material to construct a three-dimensional printed object with a variety of shapes and structures. After each layer of the three-dimensional printed object is formed, the plastic material is UV cured and hardens to bond the layer to an underlying layer of the three-dimensional printed object. This additive manufacturing method is distinguishable from traditional object-forming techniques, which mostly rely on the removal of material from a work piece by a subtractive process, such as cutting or drilling.

Recently, some 3D object printers have been developed that eject drops of melted metal from one or more ejectors to form 3D objects. These printers have a source of solid metal, such as a roll of wire or pellets, that is fed into a heated receptacle of a vessel in the printer where the solid metal is melted and the melted metal fills the receptacle. The receptacle is made of non-conductive material around which an electrical wire is wrapped to form a coil. An electrical current is passed through the coil to produce an electromagnetic field that causes the meniscus of the melted metal at a nozzle of the receptacle to separate from the melted metal within the receptacle and be propelled from the nozzle. A platform opposite the nozzle of the ejector is moved in a X-Y plane parallel to the plane of the platform by a controller operating actuators so the ejected metal drops form metal layers of an object on the platform and another actuator is operated by the controller to alter the position of the ejector or platform in the vertical or Z direction to maintain a constant distance between the ejector and an uppermost layer of the metal object being formed. This type of metal drop ejecting printer is also known as a magneto-hydrodynamic (MHD) printer.

The melted metal in the receptacle of the vessel in the printer needs to be maintained at a level sufficient to support metal drop ejection operations without exhausting the supply of melted metal in the printer. In one metal drop ejecting printer a blue laser is directed to the surface level of the melted metal in the receptacle and a reflective sensor monitors the reflection of the laser by the surface level to determine the current height of the melted metal in the receptacle. When the sensor output indicates the surface level has dropped to a threshold position within the receptacle, the wire-feeding actuator is operated to feed more solid metal into the receptacle.

The laser and reflective sensor arrangement for melted metal pool measurement presents some issues for determining accurate surface level position in the receptacle. For one, the optical alignment of the laser beam and sensor is quite sensitive to disturbances that can affect the sensor's ability to receive and maintain robust contact with the reflected light signal. This alignment is difficult to establish when the mounting bracket for the sensor is reinstalled after it is removed for servicing the upper block of the printer. The lens of the laser can also become contaminated with condensed materials, which can attenuate the beam strength. Moreover, despite an inert gas environment, such as argon, within the printer, an aluminum oxide layer can form on top of the melted metal and lead to erroneous sensor readings. This aluminum oxide layer can also contain organic contaminants carried on the surface of the solid metal. This layer can become self-supporting and prevent the laser beam from reaching the true surface of the melted metal so the sensor output becomes erroneous. Finally, the reflective sensor is expensive. A less expensive, more robust melted metal surface sensing scheme would be beneficial.

SUMMARY

A new method of determining the position of the surface level of the melted metal in the receptacle of a 3D metal object printer is more robust and economical. The method includes generating with a wire detector that is positioned between a second end of a wire guide and a receptacle in a vessel that is configured for melting solid wire received from the wire guide a first signal value indicative of a solid metal wire being present at the wire detector, generating with the wire detector a second signal value indicative of the absence of the solid metal wire at the wire detector, and determining a position of a top surface level of the melted metal in the receptacle.

A new 3D metal object printer determines the position of the surface level of the melted metal in the receptacle of a 3D metal object printer in a more robust and economical manner. The new 3D metal object printer includes an ejector head having a vessel with a receptacle within the vessel, a wire guide configured to receive solid metal wire at a first end and direct the solid metal wire through the wire guide to a second end through which the solid metal wire exits and moves toward the receptacle in the vessel, a heater configured to heat the vessel while the vessel is in the ejector head to a temperature sufficient to melt solid metal wire within the receptacle of the vessel, at least one actuator operatively connected to the solid metal wire, the at least one actuator being configured to move the solid metal wire bidirectionally through the wire guide, and a wire detector positioned between the second end of the wire guide and the receptacle in the vessel, the wire detector being configured to generate a first signal indicative of the presence of the solid metal wire at the wire detector and to generate a second signal indicative of the absence of the solid metal wire at the wire detector.

BRIEF DESCRIPTION OF THE DRAWINGS

The foregoing aspects and other features of a method of determining the position of the surface level of the melted metal in the receptacle of a 3D metal object printer that is more robust and economical than those previously known and a 3D metal object printer that implements the method are explained in the following description, taken in connection with the accompanying drawings.

DETAILED DESCRIPTION

Figure 1:
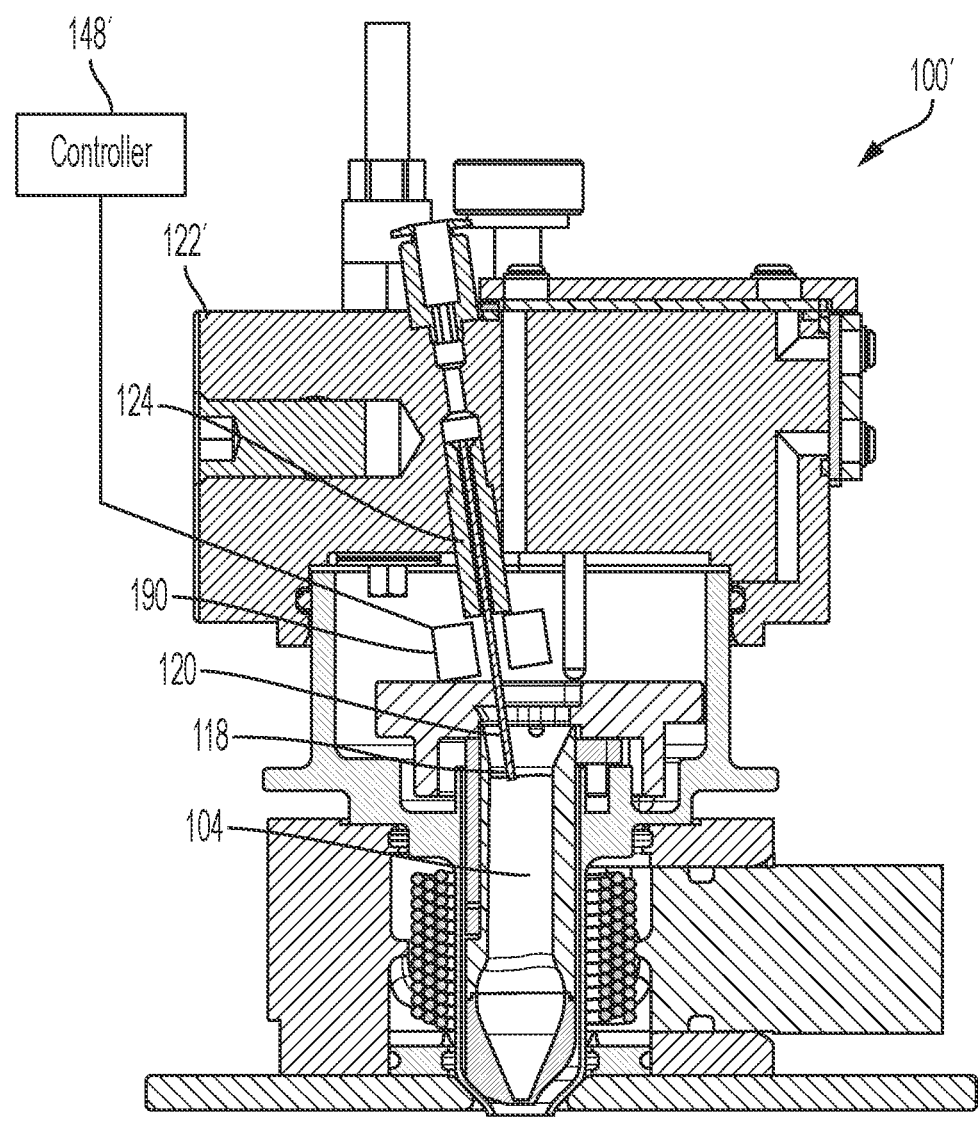
FIG. 1 depicts a new 3D metal object printer that determines the position of the surface level of the melted metal in the receptacle of a 3D metal object printer more robustly and economically than the laser measurement method.

For a general understanding of the environment for the 3D metal object printer and its operation as disclosed herein as well as the details for the printer and its operation, reference is made to the drawings. In the drawings, like reference numerals designate like elements.

Figure 5:
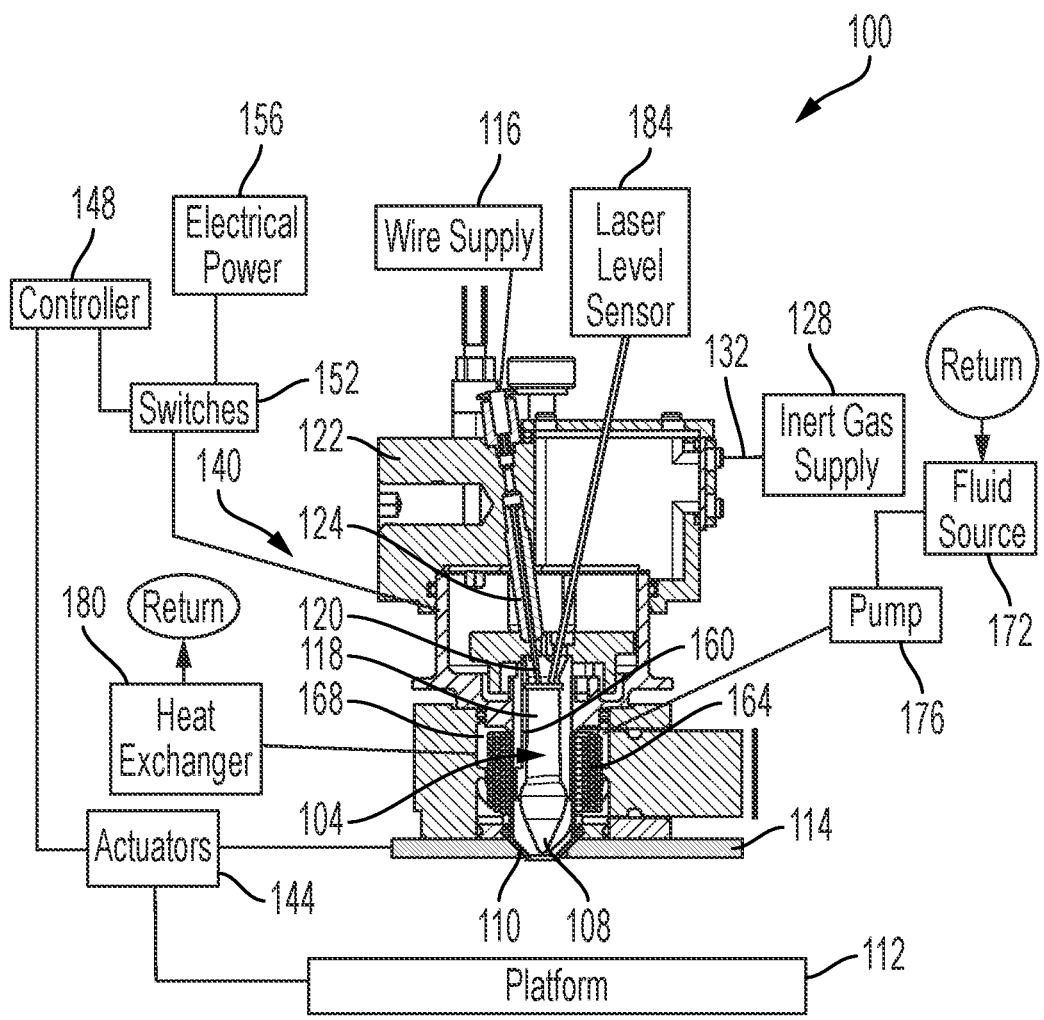
FIG. 5 is a block diagram of a 3D metal printer that uses a laser system for determining the position of the surface level of melted metal in the receptacle of the printer.

FIG. 5 illustrates an embodiment of a previously known 3D metal object printer 100 that uses a laser beam and reflective sensor to determine the surface level of melted metal within a receptacle of the printer. In the printer of FIG. 5, drops of melted bulk metal are ejected from a receptacle of a removable vessel 104 having a single nozzle 108 and drops from the nozzle form swaths for layers of an object on a platform 112. As used in this document, the term "removable vessel" means a hollow container having a receptacle configured to hold a liquid or solid substance and the container as a whole is configured for installation and removal in a 3D metal object printer. As used in this document, the term "bulk metal" means conductive metal available in aggregate form, such as wire of a commonly available gauge or pellets of macro-sized proportions. A source of bulk metal 116, such as metal wire 120, is fed into a wire guide 124 that extends through the upper housing 122 in the ejector head 140 and melted in the receptacle of the removable vessel 104 to provide melted metal for ejection from the nozzle 108 through an orifice 110 in a baseplate 114 of the ejector head 140. As used in this document, the term "nozzle" means an orifice in a removable vessel configured for the expulsion of melted metal drops from the receptacle within the removable vessel. As used in this document, the term "ejector head" means the housing and components of a 3D metal object printer that melt, eject, and regulate the ejection of melted metal drops for the production of metal objects. A melted metal level sensor 184 includes a laser and a reflective sensor. The reflection of the laser off the melted metal level is detected by the reflective sensor, which generates a signal indicative of the distance to the melted metal level. The controller receives this signal and determines the level of the volume of melted metal in the removable vessel 104 so it can be maintained at the upper level 118 in the receptacle of the removable vessel. The removable vessel 104 slides into the heater 160 so the inside diameter of the heater contacts the removable vessel and can heat solid metal within the receptacle of the removable vessel to a temperature sufficient to melt the solid metal. As used in this document, the term "solid metal" means a metal as defined by the periodic chart of elements or alloys formed with these metals in solid rather than liquid or gaseous form. The heater is separated from the removable vessel to form a volume between the heater and the removable vessel 104. An inert gas supply 128 provides a pressure regulated source of an inert gas, such as argon, to the ejector head through a gas supply tube 132. The gas flows through the volume between the heater and the removable vessel and exits the ejector head around the nozzle 108 and the orifice 110 in the baseplate 114. This flow of inert gas proximate to the nozzle insulates the ejected drops of melted metal from the ambient air at the baseplate 114 to prevent the formation of metal oxide during the flight of the ejected drops.

The ejector head 140 is movably mounted within Z-axis tracks for vertical movement of the ejector head with respect to the platform 112. One or more actuators 144 are operatively connected to the ejector head 140 to move the ejector head along a Z-axis and are operatively connected to the platform 112 to move the platform in an X-Y plane beneath the ejector head 140. The actuators 144 are operated by a controller 148 to maintain an appropriate distance between the orifice 110 in the baseplate 114 of the ejector head 140 and an uppermost surface of an object on the platform 112.

Moving the platform 112 in the X-Y plane as drops of molten metal are ejected toward the platform 112 forms a swath of melted metal drops on the object being formed. Controller 148 also operates actuators 144 to adjust the vertical distance between the ejector head 140 and the most recently formed layer on the substrate to facilitate formation of other structures on the object. While the molten metal 3D object printer 100 is depicted in FIG. 5 as being operated in a vertical orientation, other alternative orientations can be employed. Also, while the embodiment shown in FIG. 5 has a platform that moves in an X-Y plane and the ejector head moves along the Z axis, other arrangements are possible. For example, the actuators 144 can be configured to move the ejector head 140 in the X-Y plane and along the Z axis or they can be configured to move the platform 112 in both the X-Y plane and Z-axis.

A controller 148 operates the switches 152. One switch 152 can be selectively operated by the controller to provide electrical power from source 156 to the heater 160, while another switch 152 can be selectively operated by the controller to provide electrical power from another electrical source 156 to the coil 164 for generation of the electrical field that ejects a drop from the nozzle 108. Because the heater 160 generates a great deal of heat at high temperatures, the coil 164 is positioned within a chamber 168 formed by one (circular) or more walls (rectilinear shapes) of the ejector head 140. As used in this document, the term "chamber" means a volume contained within one or more walls in which a heater, a coil, and a removable vessel of a 3D metal object printer are located. The removable vessel 104 and the heater 160 are located within this chamber. The chamber is fluidically connected to a fluid source 172 through a pump 176 and also fluidically connected to a heat exchanger 180. As used in this document, the term "fluid source" refers to a container of a liquid having properties useful for absorbing heat. The heat exchanger 180 is connected through a return to the fluid source 172. Fluid from the source 172 flows through the chamber to absorb heat from the coil 164 and the fluid carries the absorbed heat through the exchanger 180, where the heat is removed by known methods. The cooled fluid is returned to the fluid source 172 for further use in maintaining the temperature of the coil in an appropriate operational range.

The controller 148 of the 3D metal object printer 100 requires data from external sources to control the printer for metal object manufacture. In general, a three-dimensional model or other digital data model of the object to be formed is stored in a memory operatively connected to the controller 148, the controller can access through a server or the like a remote database in which the digital data model is stored, or a computer-readable medium in which the digital data model is stored can be selectively coupled to the controller 148 for access. This three-dimensional model or other digital data model is processed by a slicer implemented with the controller to generate machine-ready instructions for execution by the controller 148 in a known manner to operate the components of the printer 100 and form the metal object corresponding to the model. The generation of the machine-ready instructions can include the production of intermediate models, such as when a CAD model of the device is converted into an STL data model, or other polygonal mesh or other intermediate representation, which can in turn be processed to generate machine instructions, such as g-code, for fabrication of the device by the printer. As used in this document, the term "machine-ready instructions" means computer language commands that are executed by a computer, microprocessor, or controller to operate components of a 3D metal object additive manufacturing system to form metal objects on the platform 112. The controller 148 executes the machine-ready instructions to control the ejection of the melted metal drops from the nozzle 108, the positioning of the platform 112, as well as maintaining the distance between the orifice 110 and the uppermost layer of the object on the platform 112.

Using like reference numbers for like components and removing some of the components not used to determine the surface level of the melted metal in the receptacle, a new 3D metal object printer 100' is shown in FIG. 1. The laser 184 and the reflective sensor 188 have been replaced by a wire detector 190. The wire detector 190 is located at the exit of the wire guide 124. The wire detector can be an optical or inductive sensor. An optical sensor has a light source, such as a LED, on one side of the wire path from the exit of the wire guide 124 to the receptacle in the vessel 104. On the other side of this wire path is a light sensor. The light sensor generates a signal value of a digital one or a digital zero when the wire blocks the transmission of light from the light source to the light sensor and it generates the opposite signal value when the wire is not present between the light source and light sensor. That is, the sensor generates a binary signal having two digital signal values to indicate whether the wire is opposite the sensor or not. An optical transmissive sensor with a 125° C. rating can be used for the empirically determined environment in one embodiment of the printer 100', such as the Vishay TCPT sensors available from Vishay Intertechnology of Malvern, Pa. An inductive sensor generates an inductive field and when the metal wire is present in the field, the sensor generates one digital value and when the metal wire is not in the field, the sensor generates the other digital value. The wire detector 190 is mounted with a heat sink to the upper housing 122 to pull heat from the sensor and maintain the sensor temperature within its operating range.

Determination of the melted metal surface level is based on the empirical observation that the wire melts within a short and repeatable distance after it enters the melted metal in the receptacle. Consequently, the length of the wire from the wire detector to the tip of the wire entering the melted metal is an indirect indicator of the surface of the melted metal in the receptacle. To determine the position of the surface of the melted metal, the controller 148' operates one of the actuators 144 to reverse the wire feed direction and retract the end of the wire from the melted metal in the receptacle. This reversing action is stopped once the wire detector 190 generates a signal that wire is no longer detected by the sensor. The length of time from the beginning of the wire reversal to the detection of no wire being present along with the speed of the wire reversal are used by the controller 148' to determine the current level of the melted metal in the receptacle. The wire is then advanced in the feed direction for an equal amount of time at the same speed to place the end of the wire in the melted metal again and normal operation of the printer resumes.

Figure 2:
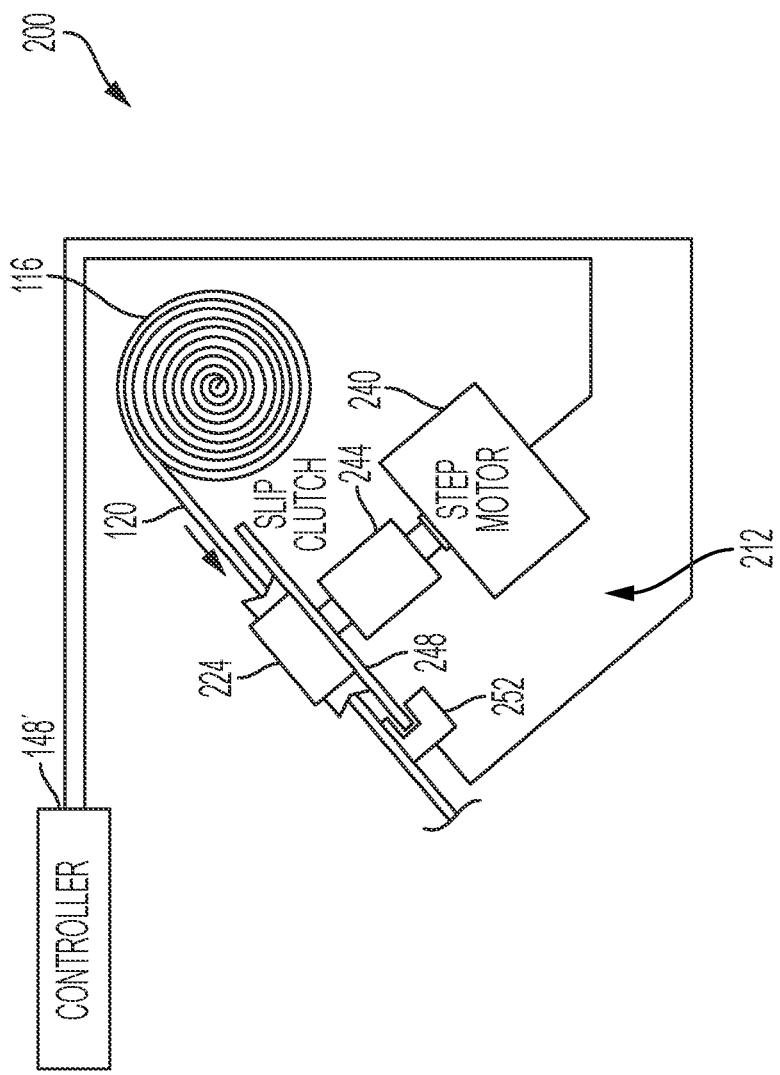
FIG. 2 is a schematic diagram of a wire feeding mechanism used to provide wire to the wire guide 124 in FIG. 1 and that measures wire retracted from the receptacle of the vessel of the printer in FIG. 1.

A mechanism 200 for feeding wire from wire supply 116 through the wire guide 124 to the vessel 104 is shown in FIG. 2. The mechanism 200 is one embodiment for dispensing wire that is suitable for determining the length of wire withdrawn from the vessel when the position of the melted metal level is identified. The controller 148' is operatively connected to an actuator, such as step motor 240, to control the rate at which the wire is delivered from supply 116 to the vessel 104. The actuator 240 drives the roller 224 and is operatively connected to the controller 148' so the controller can regulate the speed at which the actuator drives the roller 224. Another roller opposite roller 224 is free-wheeling so it follows the rate of rotation at which roller 224 is driven.

A slip clutch 244 is operatively connected to the drive shaft of actuator 240 that feeds wire to the vessel. As used in this document, the term "slip clutch" refers to a device that applies frictional force to an object to move the object up to a predetermined set point. When the range about the predetermined set point for the frictional force is exceeded, the device slips so it no longer applies the frictional force to the object. The slip clutch enables the force exerted on the wire 120 by the roller 224 to remain within the constraints of the strength of the wire no matter how frequently, how fast, or how long the actuator 240 is driven. This constant force can be maintained by either driving the actuator 240 at a speed that is higher than the fastest expected rotational speed of the drive roller 224 or by putting an encoder wheel 248 on the roller 224 and sensing the rate of rotation with a sensor 252. The signal generated by the sensor 252 indicates the angular rotation of the roller 224 and the controller 148' uses this signal and the radius of the roller 224 to identify the length of wire withdrawn from the vessel 104 in the time period from the beginning of the reversal until the wire detector 190 generates a signal that the wire is no longer present at the detector. That is, the mechanism 200 operates as a type of wire displacement sensor. Alternatively, the free-wheeling roller opposing the driven roller 224 can have an encoder 248 mounted to it to generate a signal indicative of its angular position so the length of metal wire fed by the mechanism can be determined. In a further alternative design, slip clutch 244 is omitted and the number of steps in each direction of travel that motor 240 makes can be recorded and used to determine the length of linear wire travel.

To minimize the disruptions to operational status of the printer caused by the reversal of the wire feeding, the controller 148' is further configured with programmed instructions to implement a feed-forward algorithm that continuously estimates the surface level of the melted metal based on the number of melted metal drops ejected by the printer versus the length of wire fed into the printer. Unknown tolerances occur in this estimation, but this estimating method provides a simple way to identify an appropriate time for a determination of the melted metal surface level in the receptacle using the wire reversal method. The frequency of the measurement can be set according to the desired precision of melted metal level control.

The controller 148' can be implemented with one or more general or specialized programmable processors that execute programmed instructions. The instructions and data required to perform the programmed functions can be stored in memory associated with the processors or controllers. The processors, their memories, and interface circuitry configure the controllers to perform the operations previously described as well as those described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits. During metal object formation, image data for a structure to be produced are sent to the processor or processors for controller 148' from either a scanning system or an online or work station connection for processing and generation of the signals that operate the components of the printer 100' to form an object on the platform 112.

Figure 3:
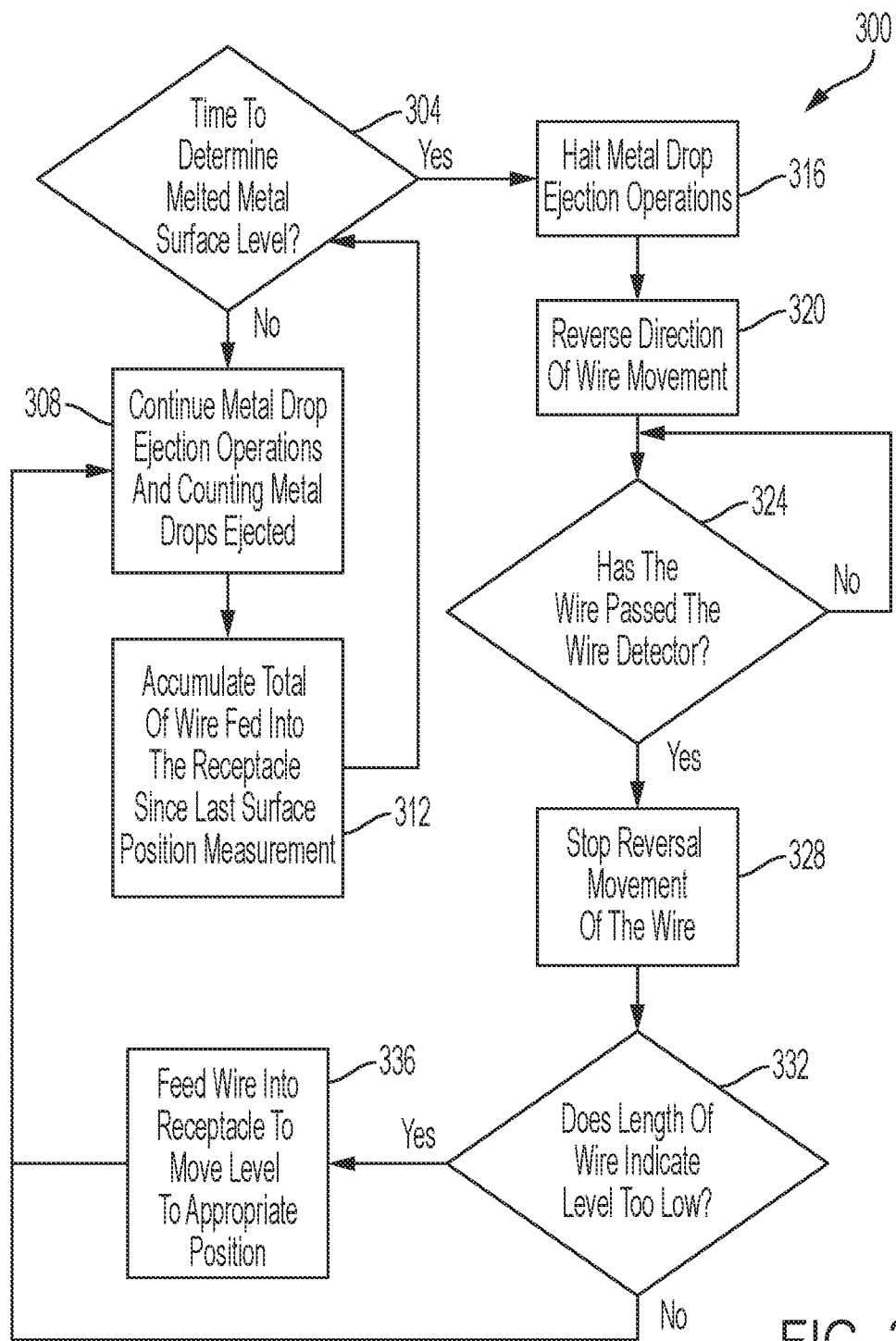
FIG. 3 is a flow diagram for a process that determines the position of the surface level of the melted metal in the receptacle of a 3D metal object printer using a wire detector and metal drop counting method.

A process for operating the 3D metal object printer 100' to determine the surface level of the melted metal in the receptacle of the printer is shown in FIG. 3. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 148' noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

FIG. 3 is a flow diagram for a process 300 that uses the wire detector 190 and the controller 148 being configured to execute programmed instructions stored in a non-transitory memory operatively connected to the controller to determine the surface level of the melted metal in the receptacle of the removable vessel during object formation operations. The process begins with a determination that the surface level of the melted metal requires checking (block 304). If no measurement is required, then metal ejecting operations continue (block 308). One way of determining that the surface level is to be checked is the method that uses the ejected drop count and the amount of wire fed into the printer to make the determination. Specifically, the controller uses the length of the wire fed into the printer since the most recent level check less the length of wire within the wire guide to identify an amount of metal that has been melted (block 312). The process also maintains a count of the number of melted metal drops that have been ejected since the most recent level check and compares the volume of melted metal that has been ejected to the amount of metal that has been melted to determine if the surface level is likely to have dropped below a predetermined position in the receptacle (block 304). If the comparison indicates that the amount of melted metal ejected since the last level check is greater than 10% of the amount of solid metal melted since the last level check, then the melted metal surface position needs to be measured more accurately. Metal drop ejections are halted (block 316) and the actuator feeding the wire into the receptacle is reversed (block 320) until the wire detector 190 generates a signal that indicates the wire is no long present at the sensor position (block 324). The reversing movement is halted (block 328) and, as noted previously, the process uses the time for retracting the wire to the wire detector and the speed of the retracting movement to determine the length of wire removed from the vessel (block 332). If that length is greater than a distance at which the surface level would be if the volume of melted metal is less than 90% of the vessel volume, then the process operates the actuator to move a length of wire into the vessel that is sufficient when melted to raise the melted metal surface level to a position where approximately 95% of the vessel volume is filled with melted metal (block 336). Once this refilling is achieved or the surface level of the melted metal does not indicate the receptacle in the vessel is less than 90% full, the metal drop ejection operations resume (block 308) for formation of the metal object until the next level check needs to occur.

Figure 4:
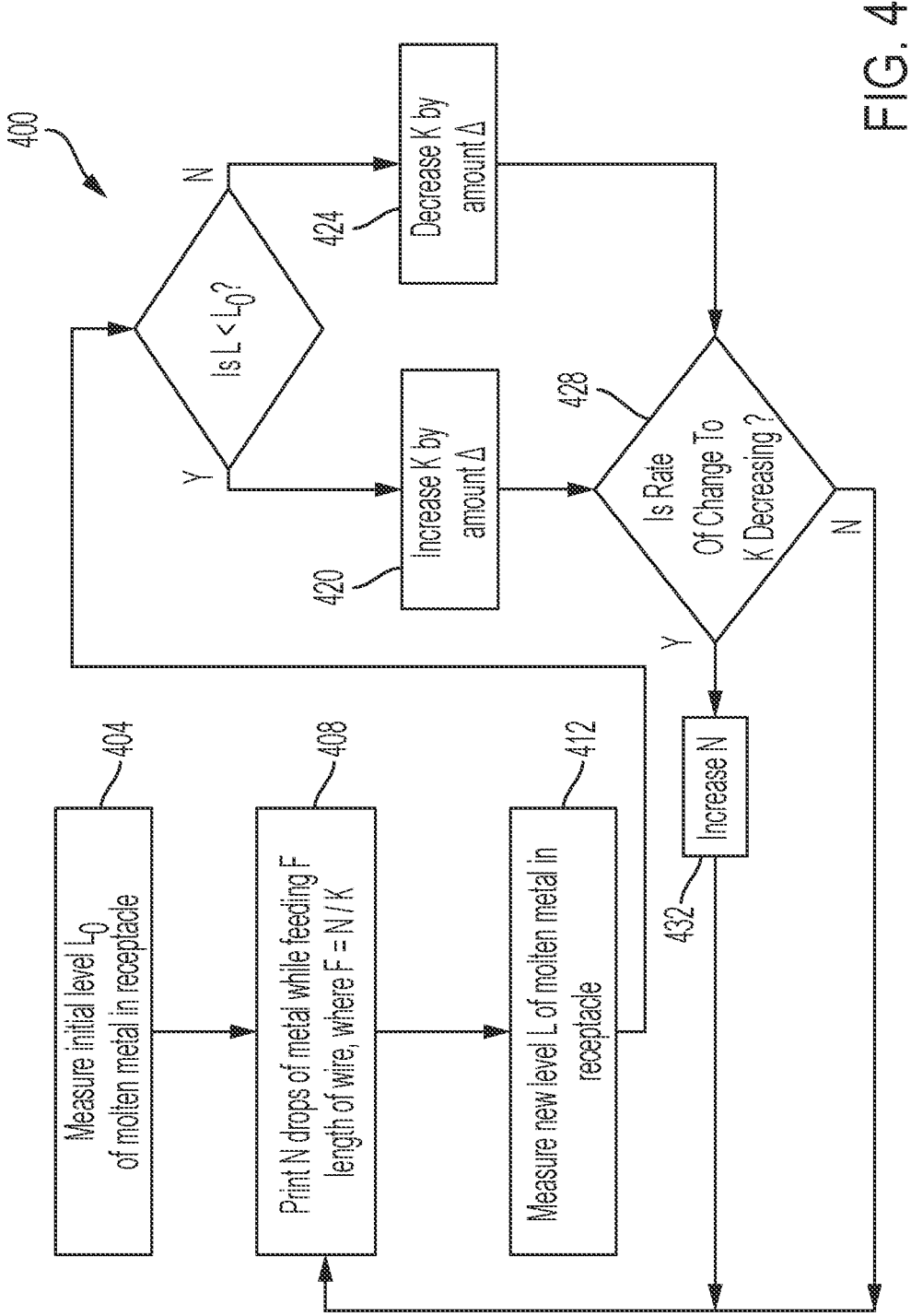
FIG. 4 is a flow diagram of a process that adjusts a proportionality constant K that is used to determine the number of ejected metal drops counted between surface level measurements of the melted metal within the receptacle of the vessel of the printer in FIG. 1.

A flow diagram for an alternative process 400 for performing the melted level measurements during object formation is shown in FIG. 4. This process counts a number of ejected melted metal drops N that corresponds to a predetermined number of multiples of the volume of the vessel, such as ten multiples. This number of drops N is formed by melting a length of wire F. Because of tolerances in the dimensions of the wire and volumes of the drops, an exact length F always forming N drops cannot be defined. Therefore, N is related to F by a proportionality constant K. An initial value of K is determined analytically using the nominal diameter of the solid metal wire and the nominal drop mass. Using the formula N=F×K, the initial length of wire F that forms the predetermined number of volumes of the vessel can be identified. The process of FIG. 4 adjusts the constant K at each measurement of the melted metal level using the difference between the expected level position and the measured level position. Specifically, if the measured level is less than the expected level, then not enough wire has been fed to the vessel so the constant K is increased by a predetermined amount that is proportional to the difference between the expected level and the actual level. If the measured level is higher than expected, then too much wire has been fed to the vessel so the constant K is decreased by an amount proportional to the difference.

In more detail, the process 400 begins with the filling of the vessel with melted metal and a measurement of the full melted metal level by withdrawing the wire from the vessel and measuring the length of wire between the wire detector and the melted metal surface using one of the methods noted above (block 404). The number of ejected metal drops is counted until the count equals N (block 408). The melted metal level in the vessel is measured, again using one of the methods discussed previously (block 412). The current measured level is compared to the previous metal level (block 416). If the current level is less than the previous level, then K is increased (block 420). If the current level is greater than the previous level, then K is decreased (block 424). If the rate of change in K is decreasing (block 428), then N is increased since K is converging to an optimum value (block 432). Otherwise, the process continues with the current value of N. The value of N is increased only when the change in K shows the value of the constant is converging to a narrow range. By increasing N, the intervals between metal level measurements is increased and the down time for level measurements is decreased while productivity is increased.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A metal drop ejecting apparatus comprising:
    an ejector head having a vessel with a receptacle within the vessel, the receptacle being in fluid communication with a nozzle of the vessel, which is positioned within the ejector head, the ejector head being configured to eject drops of molten metal from the receptacle through the nozzle of the vessel;
    a wire guide configured to receive solid metal wire at a first end and direct the solid metal wire through the wire guide to a second end through which the solid metal wire exits and moves toward the receptacle in the vessel;
    a heater configured to heat the vessel while the vessel is in the ejector head to a temperature sufficient to melt solid metal wire within the receptacle of the vessel;
    at least one actuator operatively connected to the solid metal wire, the at least one actuator being configured to move the solid metal wire bidirectionally through the wire guide;
    a wire detector positioned between the second end of the wire guide and the receptacle in the vessel, the wire detector being configured to generate a first signal indicative of the presence of the solid metal wire at the wire detector and to generate a second signal indicative of the absence of the solid metal wire at the wire detector; and
    a controller operatively connected to the at least one actuator, the ejector head, and the heater, the controller being configured to:
        operate the heater to melt the solid metal wire within the receptacle of the vessel;
        operate the ejector head to eject drops of melted metal from the receptacle;
        operate the at least one actuator to retract the solid metal wire from the receptacle until the wire detector generates the second signal;
        identify a length of the solid metal wire retracted from the receptacle to the wire detector using a speed of the solid metal wire while being retracted and a time period identified between a start of the solid metal wire retraction and the generation of the second signal by the wire detector;
        determine a position of a top surface of the melted metal in the receptacle using the identified length of the solid metal wire retracted from the receptacle to the wire detector;
        compare the determined position of the top surface of the melted metal in the receptacle to a position in the receptacle that corresponds to the receptacle being filled to 90% of a volumetric capacity of the receptacle;
        accumulate a count of melted metal drops ejected by the ejector head since the position of the top surface of the melted metal was determined;
        retract the solid metal wire from the receptacle when the accumulated count of melted metal drops reaches a predetermined count N, which corresponds to a length of solid metal wire F multiplied by a proportionality constant K;
        identify the position of the top surface of the melted metal in the receptacle after the predetermined count N has been reached and the solid metal wire has been retracted from the receptacle; and
        adjust a value of the proportionality constant K using a difference between the determined position of the top surface of the melted metal in the receptacle when full and the identified position of the top surface of the melted metal in the receptacle after the predetermined count N has been reached.

2. The metal drop ejecting apparatus of claim 1, the controller being further configured to:
    increase the value of the proportionality constant K when the difference is negative; and
    decrease the value of the proportionality constant K when the difference is positive.

3. The metal drop ejecting apparatus of claim 2, the controller being further configured to:
    increase N when a rate of change in the proportionality constant K over successive adjustments of K is decreasing.

4. The metal drop ejecting apparatus of claim 1 wherein the vessel is removable from the ejector head.

5. The metal drop ejecting apparatus of claim 1 wherein the wire detector is an optical transmissive sensor.

6. The metal drop ejecting apparatus of claim 1 wherein the wire detector is an inductive sensor.

7. A metal drop ejecting apparatus comprising:
    an ejector head having a vessel with a receptacle within the vessel;
    a wire guide configured to receive solid metal wire at a first end and direct the solid metal wire through the wire guide to a second end through which the solid metal wire exits and moves toward the receptacle in the vessel;
    a heater configured to heat the vessel while the vessel is in the ejector head to a temperature sufficient to melt solid metal wire within the receptacle of the vessel;
    at least one actuator operatively connected to the solid metal wire, the at least one actuator being configured to move the solid metal wire bidirectionally through the wire guide;
    a wire detector positioned between the second end of the wire guide and the receptacle in the vessel, the wire detector being configured to generate a first signal indicative of the presence of the solid metal wire at the wire detector and to generate a second signal indicative of the absence of the solid metal wire at the wire detector; and
    a controller operatively connected to the at least one actuator, the ejector head, and the heater, the controller being configured to:
        operate the heater to melt the solid metal wire within the receptacle of the vessel;
        operate the ejector head to eject drops of melted metal from the receptacle;
        operate the at least one actuator to retract the solid metal wire from the receptacle until the wire detector generates the second signal;
        determine a position of a top surface of the melted metal in the receptacle;

identify a length of the solid metal wire retracted from the receptacle to the wire detector to determine the position of the top surface of the melted metal in the receptacle, the controller identifying the length by using a speed of the solid metal wire while being retracted and a time period identified between a start of the solid metal wire retraction and the generation of the second signal by the wire detector;

compare the determined position of the top surface of the melted metal in the receptacle to a position in the receptacle that corresponds to the receptacle being filled to 90% of a volumetric capacity of the receptacle;

accumulate a count of melted metal drops ejected by the ejector head since the position of the top surface of the melted metal was determined;

retract the solid metal wire from the receptacle when the accumulated count of melted metal drops reaches a predetermined count N, which corresponds to a length of solid metal wire F multiplied by a proportionality constant K;

identify the position of the top surface of the melted metal in the receptacle after the predetermined count N has been reached and the solid metal wire has been retracted from the receptacle; and adjust a value of the proportionality constant K using a difference between the determined position of the top surface of the melted metal in the receptacle when full and the identified position of the top surface of the melted metal in the receptacle after the predetermined count N has been reached.

8. The metal drop ejecting apparatus of claim 7 further comprising:

a pair of rollers, at least one of the rollers being driven by the at least one actuator;

a sensor configured to generate a signal corresponding to a rotational speed of the at least one of the rollers driven by the at least one actuator; and the controller being further configured to identify the length of the solid metal wire retracted from the receptacle by;

using the signal generated by the sensor while the solid metal wire is being retracted from the receptacle, a radius of the at least one roller, and a time period identified between a start of the solid metal wire retraction and the generation of the second signal by the wire detector.

9. The metal drop ejecting apparatus of claim 7, the controller being further configured to:

accumulate a count of melted metal drops ejected by the ejector head;

identify an amount of solid metal wire melted in the receptacle; and determine whether the top surface of the melted metal in the receptacle is below the position that corresponds to the receptacle being filled to 90% of the volumetric capacity of the receptacle before operating the at least one actuator to retract the solid metal wire.

10. The metal drop ejecting apparatus of claim 9, the controller being further configured to determine the position of the top surface of the melted metal in the receptacle by determining whether more than 10% of the amount of solid metal wire melted in the receptacle has been ejected.

11. The metal drop ejecting apparatus of claim 7, the controller being further configured to:

increase the value of the proportionality constant K when the difference is negative; and decrease the value of the proportionality constant K when the difference is positive.

12. The metal drop ejecting apparatus of claim 11, the controller being further configured to:

increase N when a rate of change in the proportionality constant K over successive adjustments of K is decreasing.

13. The metal drop ejecting apparatus of claim 7 wherein the vessel is removable from the ejector head.

14. The metal drop ejecting apparatus of claim 7 wherein the wire detector is an optical transmissive sensor.

15. The metal drop ejecting apparatus of claim 7 wherein the wire detector is an inductive sensor.

* * * * *